United States Patent
Hou et al.

(10) Patent No.: US 11,617,023 B2
(45) Date of Patent: Mar. 28, 2023

(54) METHOD FOR BRIGHTNESS ENHANCEMENT OF PREVIEW IMAGE, APPARATUS, AND MEDIUM

(71) Applicant: Beijing Xiaomi Mobile Software Co., Ltd., Beijing (CN)

(72) Inventors: Enxing Hou, Beijing (CN); Junqi Xie, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/101,752

(22) Filed: Nov. 23, 2020

(65) Prior Publication Data

US 2021/0400188 A1     Dec. 23, 2021

(30) Foreign Application Priority Data

Jun. 19, 2020 (CN) .......................... 202010565823.4

(51) Int. Cl.
*H04N 5/232* (2006.01)
*H04N 5/235* (2006.01)
(Continued)

(52) U.S. Cl.
CPC ............. *H04N 23/64* (2023.01); *G06T 5/009* (2013.01); *G06T 7/70* (2017.01); *H04N 23/632* (2023.01); *H04N 23/71* (2023.01); *H04N 23/741* (2023.01)

(58) Field of Classification Search
CPC ......... H04N 5/23222; H04N 5/232935; H04N 5/2351; H04N 5/2355; H04N 5/232933;
(Continued)

(56) References Cited

U.S. PATENT DOCUMENTS

2003/0137597 A1* 7/2003 Sakamoto ............ H04N 5/2354
                                                                   348/371
2005/0151855 A1* 7/2005 Kim ...................... H04N 9/735
                                                                 348/223.1

(Continued)

FOREIGN PATENT DOCUMENTS

| CN | 104113702 A | 10/2014 |
| CN | 104853083 A | 8/2015 |

(Continued)

OTHER PUBLICATIONS

First Office Action in Chinese Application No. 202010565823.4, dated May 8, 2021.

(Continued)

*Primary Examiner* — Usman A Khan
(74) *Attorney, Agent, or Firm* — Finnegan, Henderson, Farabow, Garrett & Dunner, L.L.P.

(57) ABSTRACT

A method for displaying a preview image, includes: obtaining a real-time image collected by an imaging device of a mobile terminal without turning on a flashlight; determining at least one target area in the real-time image; determining a distance between the mobile terminal and an entity corresponding to each of the at least one target area; determining a brightness enhancement degree for each of the at least one target area respectively according to the distance corresponding to each of the at least one target area and a flashlight parameter of the mobile terminal; and performing brightness enhancement on each of the at least one target area respectively according to the brightness enhancement degree for each of the at least one target area, and displaying the brightness-enhanced real-time image as a preview image.

16 Claims, 5 Drawing Sheets

(51) Int. Cl.
*H04N 9/73* (2023.01)
*G06T 5/00* (2006.01)
*H04N 23/60* (2023.01)
*G06T 7/70* (2017.01)
*H04N 23/71* (2023.01)
*H04N 23/63* (2023.01)
*H04N 23/741* (2023.01)

(58) Field of Classification Search
CPC .. H04N 5/2256; H04N 5/23216; H04N 9/735; H04N 5/23219; H04N 5/2354; G06T 5/009; G06T 5/008; G06T 7/70; G06T 7/97; G06T 7/90
USPC .................................................. 348/207.99
See application file for complete search history.

(56) References Cited

U.S. PATENT DOCUMENTS

| | | | |
|---|---|---|---|
| 2007/0126876 A1 | 6/2007 | Gallagher et al. | |
| 2011/0001859 A1* | 1/2011 | Matsuura | H04N 5/2354 348/296 |
| 2011/0205392 A1* | 8/2011 | Yokoi | H04N 9/735 348/224.1 |
| 2013/0222643 A1* | 8/2013 | Tseng | H04N 5/2354 348/234 |
| 2013/0235253 A1 | 9/2013 | Onuki et al. | |
| 2014/0063287 A1* | 3/2014 | Yamada | H04N 5/232123 348/229.1 |
| 2014/0217901 A1* | 8/2014 | Logiudice | H05B 45/12 315/297 |
| 2015/0022712 A1* | 1/2015 | Koishi | G02B 7/36 348/352 |
| 2015/0070526 A1* | 3/2015 | Kinoshita | H04N 5/23219 348/222.1 |
| 2015/0237243 A1* | 8/2015 | Suzuki | H04N 5/2354 348/140 |
| 2017/0323465 A1* | 11/2017 | Nakada | G06T 5/007 |
| 2018/0241980 A1* | 8/2018 | Lee | H04N 5/2258 |
| 2019/0037191 A1* | 1/2019 | Nishio | G06T 7/97 |
| 2019/0364189 A1* | 11/2019 | Miyazaki | H04N 5/37455 |
| 2021/0075952 A1* | 3/2021 | Nakada | H04N 5/232 |

FOREIGN PATENT DOCUMENTS

| | | |
|---|---|---|
| EP | 2793457 A1 | 10/2014 |
| JP | 2015-154348 A | 8/2015 |
| JP | 2019140698 A | 8/2019 |
| KR | 10-2010-0109828 A | 10/2010 |
| KR | 10-2016-0095606 A | 8/2016 |
| KR | 10-2020-0017299 A | 2/2020 |

OTHER PUBLICATIONS

Extended European Search Report in European Application No. 21158595.5, dated Jul. 23, 2021.
Notice of Reasons for Refusal dated Dec. 14, 2021, from the Japanese Patent Office issued in counterpart Japanese Application No. 2020-198223.
Notification of Reasons for Refusal dated Dec. 13, 2021, from the Korean Intellectual Property Office issued in counterpart Korean Application No. 10-2020-0173128.
Notice of Reasons for Refusal in Japanese Application No. 2020-198223, dated Jul. 19, 2022.

\* cited by examiner

METHOD FOR BRIGHTNESS ENHANCEMENT OF PREVIEW IMAGE, APPARATUS, AND MEDIUM

CROSS-REFERENCE TO RELATED APPLICATION

This application is based upon and claims priority to Chinese Patent Application No. 202010565823.4, filed on Jun. 19, 2020, the entire content of which is incorporated herein by reference.

TECHNICAL FIELD

The present disclosure relates to a field of data processing technologies by mobile terminals, and more particularly, to a method for displaying a preview image, an apparatus, and a medium.

BACKGROUND

When a user uses a shooting function of a mobile terminal, overexposure or underexposure may occur, which leads to failure of obtaining ideal images after taking multiple shots.

SUMMARY

According to a first aspect of embodiments of the present disclosure, a method for displaying a preview image, which is applied to a mobile terminal, includes: obtaining a real-time image collected by an imaging device of the mobile terminal without turning on a flashlight; determining at least one target area in the real-time image; determining a distance between the mobile terminal and an entity corresponding to each of the at least one target area; determining a brightness enhancement degree for each of the at least one target area respectively according to the distance corresponding to each of the at least one target area and a flashlight parameter of the mobile terminal; and performing brightness enhancement on each of the at least one target area respectively according to the brightness enhancement degree for each of the at least one target area, and displaying the brightness-enhanced real-time image as a preview image.

According to a second aspect of embodiments of the present disclosure, a mobile terminal includes: a processor and a memory configured to store instructions executable by the processor. The processor is configured to: obtain a real-time image collected by an imaging device of the mobile terminal without turning on a flashlight; determine at least one target area in the real-time image; determine a distance between the mobile terminal and an entity corresponding to each of the at least one target area; determine a brightness enhancement degree for each of the at least one target area respectively according to the distance corresponding to each of the at least one target area and a flashlight parameter of the mobile terminal; and perform brightness enhancement on each of the at least one target area respectively according to the brightness enhancement degree for each of the at least one target area, and display the brightness-enhanced real-time image as a preview image.

According to a third aspect of embodiments of the present disclosure, a non-transitory computer-readable storage medium has stored therein instructions that, when executed by a processor of a mobile terminal, cause the mobile terminal to perform the method according to the first aspect.

It is understood that the above general description and the following detailed description are only exemplary and explanatory, and do not limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Embodiments of the present disclosure provide a method for displaying a preview image. This method is applicable to a mobile terminal, such as a smart camera, a smart phone, and a smart tablet. In some embodiments, a flashlight of the mobile terminal may be lighted in a pulse mode, supplementary lighting effect of an image may be available only after the shooting is completed.

Figure 1:
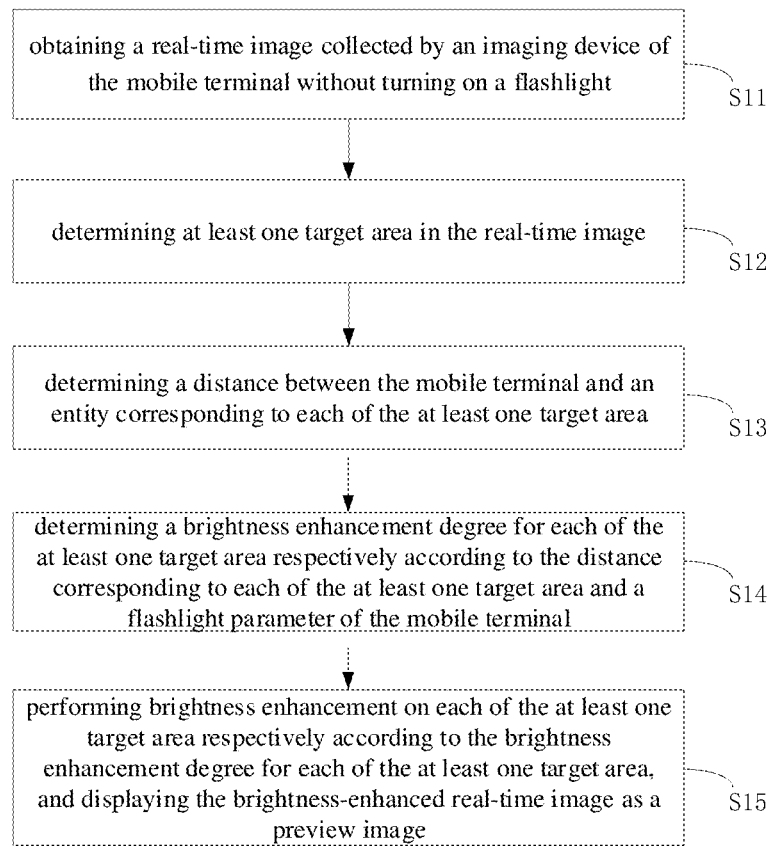
FIG. 1 is a flowchart of a method for displaying a preview image according to an exemplary embodiment.

FIG. 1 is a flowchart of a method for displaying a preview image according to an exemplary embodiment. As illustrated in FIG. 1, the method includes the following actions.

At block S11, a real-time image collected by an imaging device of the mobile terminal without turning on a flashlight is obtained.

At block S12, at least one target area in the real-time image is determined.

At block S13, a distance between the mobile terminal and an entity corresponding to each of the at least one target area is determined.

At block S14, a brightness enhancement degree for each of the at least one target area is determined respectively according to the distance corresponding to each of the at least one target area and a flashlight parameter of the mobile terminal.

At block S15, brightness enhancement is performed on each of the at least one target area respectively according to the brightness enhancement degree for each of the at least one target area, and the brightness-enhanced real-time image is displayed as a preview image.

In an embodiment, in a condition that a user turns on the imaging device and the flashlight is turned off, for example, when a camera application is opened, an image of shooting effect captured at the current shooting position when the flashlight is used is determined. The image of shooting effect is displayed as a preview image to the user. The user may adjust the shooting position or set shooting parameters based on the preview image, so that an image with satisfactory effect may be directly captured without taking multiple shots, and user experience is improved.

Figure 2:
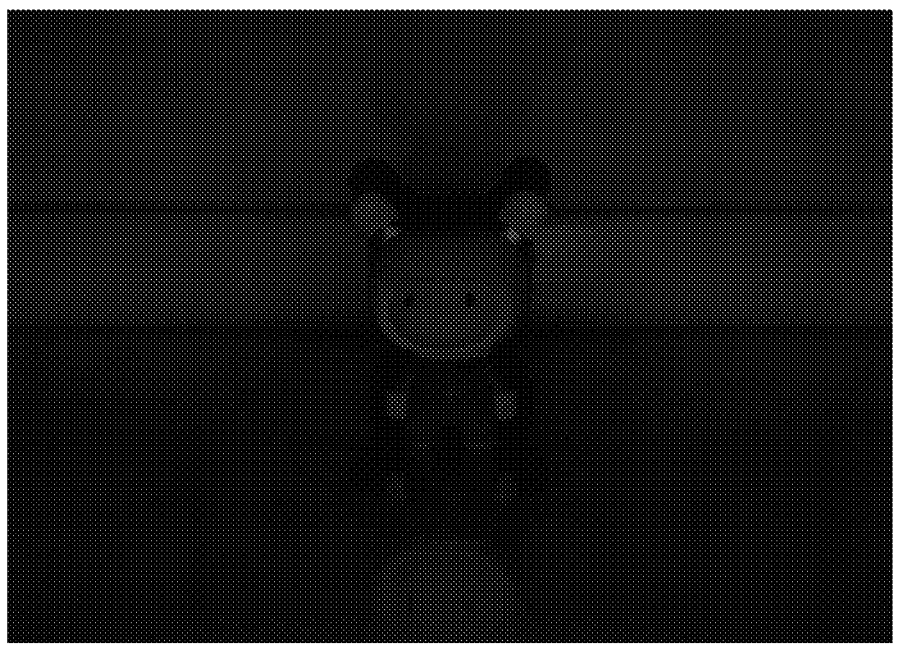
FIG. 2 is a real-time image collected by an imaging device after a camera application is opened when a flashlight of the imaging device is turned off, according to an exemplary embodiment.
Figure 3:
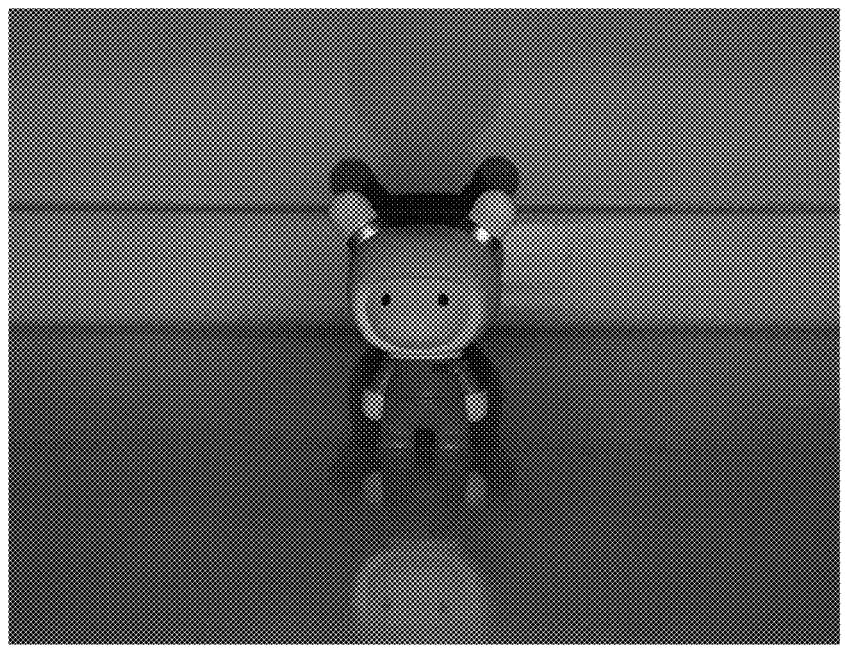
FIG. 3 is an image obtained after performing the method in FIG. 1 on the real-time image in FIG. 2, according to an exemplary embodiment.
Figure 4:
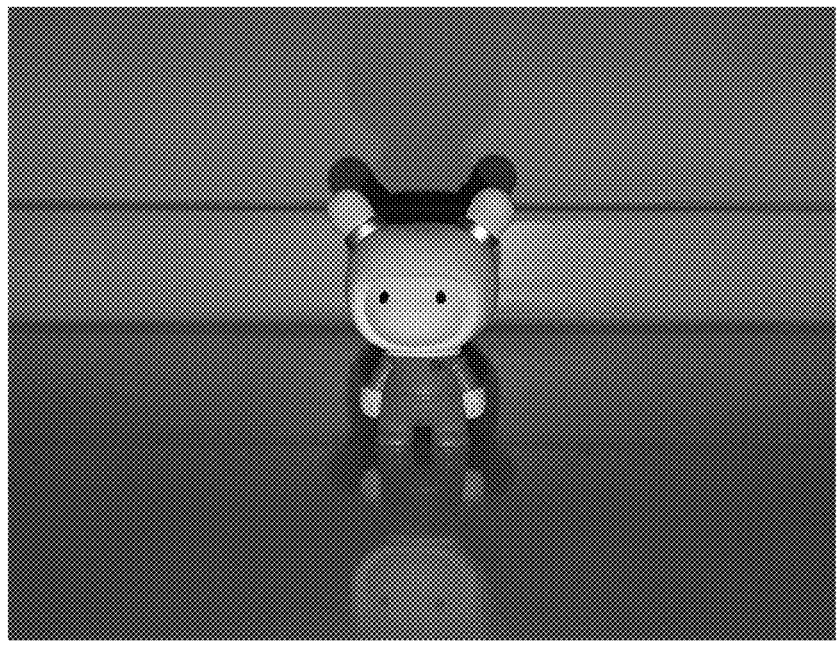
FIG. 4 is an image obtained after performing the method in FIG. 1 on the real-time image in FIG. 2, according to an exemplary embodiment.

For example, FIG. 2 is a real-time image collected by an imaging device after a camera application is opened when a flashlight of the imaging device is turned off, according to an exemplary embodiment. By using the above method, a displayed preview image may be as illustrated in FIG. 3. After viewing the preview image shown in FIG. 3, the user is informed that if the flashlight is directly turned on to take photos, an underexposed effect image as shown in FIG. 3 may be captured. As the user is informed of the shooting effect of turning on the flashlight in advance, the user may improve the effect of the preview image through manners such as adjusting a shooting distance in advance, improving brightness of the ambient light source, and adjusting the parameter of the flashlight. For example, when the preview image changes to the effect shown in FIG. 4, the user may turn on the flashlight and take photos.

Figure 5:
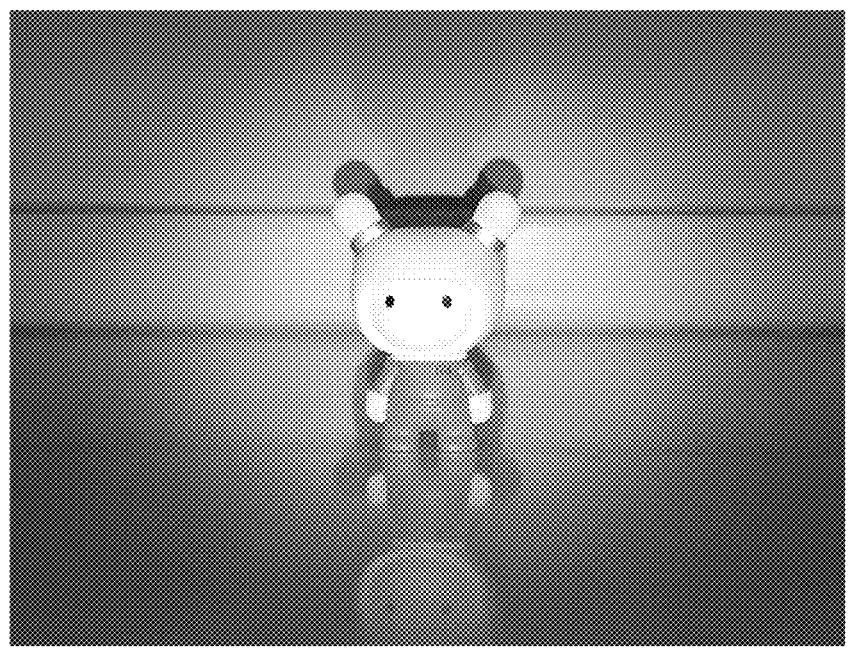
FIG. 5 is an image obtained after performing the method in FIG. 1 on the real-time image in FIG. 2, according to an exemplary embodiment.

Also for example, FIG. 2 is a real-time image collected by the imaging device after the camera application is opened when the flashlight of the imaging device is turned off. By using the above method, a displayed preview image may be as illustrated in FIG. 5. After viewing the preview image shown in FIG. 5, the user is informed that if the flashlight is turned on directly to take photos, an overexposed effect image shown in FIG. 5 may be captured. As the user is informed of the shooting effect of turning on the flashlight in advance, the user may improve the effect of the preview image through manners such as adjusting the shooting distance in advance, reducing the brightness of the ambient light source, and adjusting the parameter of the flashlight. For example, when the preview image changes to the effect shown in FIG. 4, the user may turn on the flashlight for shooting.

Referring back to FIG. 1, in an embodiment, determining the at least one target area in the real-time image at block S12 includes: determining at least one independent object in the real-time image, and determining an area corresponding to each of the at least one independent object as one target area.

The at least one area respectively corresponding to the at least one independent object may not overlap with each other. For example, if two persons are included in the real-time image, when the first person blocks part of the second person, an area corresponding to the first person is a portion of the real-time image containing the content of the first person; an area corresponding to the second person is a portion of the real-time image containing the content of the second person, this portion does not include the content of the first person.

For example, the real-time image includes three persons, and an area corresponding to each person is respectively taken as one target area, and three target areas are obtained.

For example, the real-time image includes a person and an animal, an area corresponding to the person is determined as a first target area and an area corresponding to the animal is determined as a second target area.

In an embodiment, determining the at least one target area in the real-time image at block S12 includes: determining the at least one independent object and a background area in the real-time image, determining an area corresponding to each of the at least one independent object as one target area, and determining an area corresponding to the background area as one target area.

The at least one area respectively corresponding to the at least one independent object may not overlap with each other. The background area is an area other than the at least one area respectively corresponding to the at least one independent object. For example, the content of the real-time image includes two persons in a grass background, and the background area is the grass background portion where the two persons are removed.

In an embodiment, the background area is a portion of the area other than the at least one area respectively corresponding to the at least one independent object. For example, the content of the real-time image is the sky and the two persons in the grass, and the background area is the grass background portion obtained by removing the areas corresponding to the two persons and further removing the area corresponding to the sky.

In an embodiment, determining the at least one target area in the real-time image at block S12 includes: determining at least one independent object in the real-time image, and when a number of independent objects located in a central area of the real-time image is greater than 1, determining one independent object from the independent objects as a subject, and determining an area corresponding to the subject as the target area.

Determining an independent object from the independent objects as the subject includes one of the following manners.

In a first manner, an independent object located in a central position among the independent objects is determined as the subject. For example, the real-time image includes three persons, a person located in the middle position is determined as the subject.

In a second manner, an independent object with a maximum number of pixels covered in the real-time image from the independent objects is determined as the subject. For example, the real-time image includes three persons, a person with the maximum number of pixels covered in the real-time image is determined as the subject.

In an embodiment, determining the distance between the mobile terminal and the entity corresponding to each of the at least one target area at block S13 includes: measuring the distance between the mobile terminal and the entity corresponding to each of the at least one target area by using a distance measuring device built in the mobile terminal or a distance measuring device cooperating with the mobile terminal. The distance measuring device may include a laser focus sensor, a 3-D depth sensor, or a phase focus sensor.

The distance measuring device cooperating with the mobile terminal may be connected to the mobile terminal by a wired or wireless connection. When the distance measuring device is connected to the mobile terminal through the wireless connection, the wireless connection may be a short-range wireless communication mode (such as Bluetooth, ZIGBEE, and WiFi) or other wireless communication modes (such as 4G or 5G communication modes).

In an embodiment, determining the brightness enhancement degree for each of the at least one target area respectively according to the distance corresponding to each of the at least one target area and the flashlight parameter of the mobile terminal at block S15 includes: obtaining an ambient light intensity based on an automatic exposure function of the imaging device, and determining a light intensity of the flashlight according to a luminous flux parameter of the flashlight and the distance; calculating a ratio of a sum of the ambient light intensity and the light intensity of the flashlight to the ambient light intensity; and determining the brightness enhancement degree according to the ratio.

The luminous flux parameter of the flashlight may be an inherent parameter of the flashlight. When the light source is considered as a 180-degree hemisphere emitting light, the light intensity of the flashlight may be calculated according to the shooting distance.

In an embodiment, determining the brightness enhancement degree according to the ratio includes one of:determining the ratio as the brightness enhancement degree; or setting a positive correlation function between the ratio and the brightness enhancement degree, and calculating the brightness enhancement degree corresponding to the ratio according to the positive correlation function.

In an embodiment, determining the brightness enhancement degree for each of the at least one target area respectively according to the distance corresponding to each of the at least one target area and the flashlight parameter of the mobile terminal at block S15 includes: obtaining the ambient light intensity based on the automatic exposure function of the imaging device, and determining the light intensity of the flash light according to the luminous flux parameter of the flash light and the distance; and determining the sum of the ambient light intensity and the light intensity of the flashlight, and determining the brightness enhancement degree according to the sum of the ambient light intensity and the light intensity of the flashlight.

The brightness enhancement degree may be an increasing degree of a gray value of each pixel in the target area. The brightness enhancement degree is positively correlated with the gray value increment of a corresponding pixel. The higher the brightness enhancement degree, the greater the gray value increment of the pixel after the brightness enhancement process. The maximum gray value of the pixel after the brightness enhancement process may be 255.

Embodiments of the present disclosure also provide a photographing method, including: displaying a preview image using the method described above; and after receiving a photographing trigger instruction, turning on a flashlight for photographing to obtain a captured image.

After the preview image is displayed by using the method provided in the above embodiments, the mobile terminal waits for the user to adjust the shooting distance or adjust the shooting parameter, and the flashlight is turned on for photographing to obtain the captured image when receiving the photographing trigger instruction.

Figure 6:
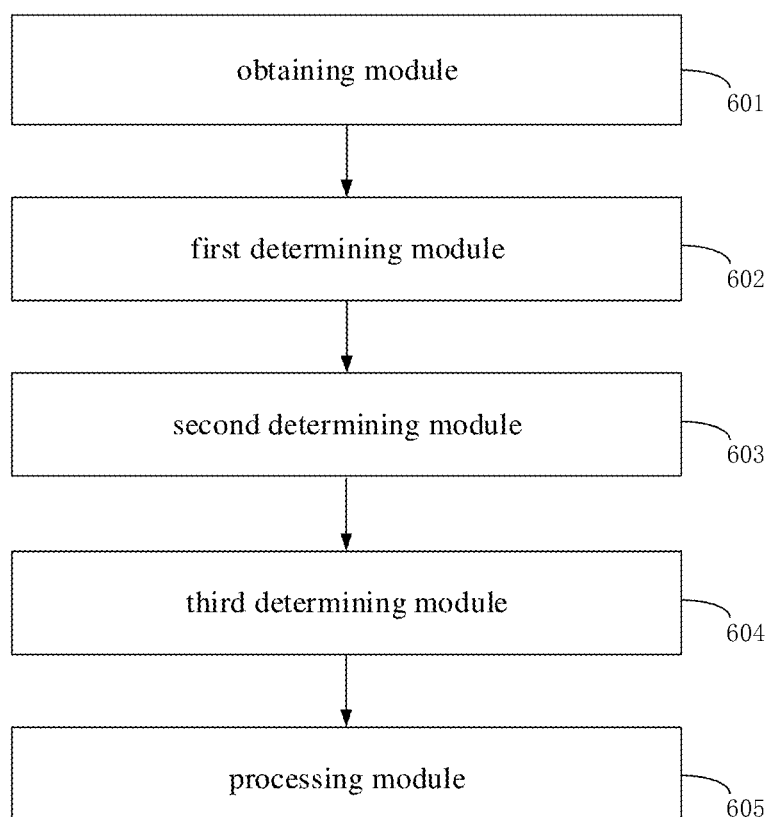
FIG. 6 is a block diagram of an apparatus for displaying a preview image according to an exemplary embodiment.

FIG. 6 is a block diagram of an apparatus for displaying a preview image according to an exemplary embodiment. As illustrated in FIG. 6, the apparatus includes: an obtaining module 601, a first determining module 602, a second determining module 603, a third determining module 604, and a processing module 605.

The obtaining module 601 is configured to obtain a real-time image collected by an imaging device of the mobile terminal without turning on a flashlight of the imaging device.

The first determining module 602 is configured to determine at least one target area in the real-time image.

The second determining module 603 is configured to determine a distance between the mobile terminal and an entity corresponding to each of the at least one target area.

The third determining module 604 is configured to determine a brightness enhancement degree for each of the at least one target area respectively according to the distance corresponding to each of the at least one target area and a flashlight parameter of the mobile terminal.

The processing module 605 is configured to perform brightness enhancement on each of the at least one target area respectively according to the brightness enhancement degree for each of the at least one target area, and display the brightness-enhanced real-time image as a preview image.

In an embodiment, the first determining module 602 is further configured to determine the at least one target area in the real-time image by: determining at least one independent object in the real-time image, and determining an area corresponding to each of the at least one independent object as one target area; or determining the at least one independent object and a background area in the real-time image, determining an area corresponding to each of the at least one independent object as one target area, and determining an area corresponding to the background area as one target area.

In an embodiment, the first determining module 602 is further configured to determine the at least one target area in the real-time image by: determining at least one independent object in the real-time image, and when a number of independent objects located in a central area of the real-time image is greater than 1, determining one independent object from the independent objects as a subject, and determining an area corresponding to the subject as the target area.

In an embodiment, determining the one independent object from the independent objects as the subject includes one of: determining an independent object located in a central position among the independent objects as the subject; or determining an independent object with a maximum number of pixels covered in the real-time image from the independent objects as the subject.

In an embodiment, the second determining module 603 is further configured to determine the distance between the mobile terminal and the entity corresponding to each of the at least one target area by: measuring the distance between the mobile terminal and the entity each of corresponding to the at least one target area by using a distance measuring device built in the mobile terminal or a distance measuring device cooperating with the mobile terminal.

In an embodiment, the third determining module 604 includes a first processing unit or a second processing unit.

The first processing unit is configured to: obtain an ambient light intensity based on an automatic exposure function of the imaging device, and determine a light intensity of the flashlight based on a luminous flux parameter of the flashlight and the distance; determine a ratio of a sum of the ambient light intensity and the light intensity of the flashlight to the ambient light intensity; and determine the brightness enhancement degree according to the ratio.

The second processing unit is configured to: obtain the ambient light intensity based on the automatic exposure function of the imaging device, and determine the light intensity of the flash light based on the luminous flux parameter of the flash light and the distance; and determine the sum of the ambient light intensity and the light intensity of the flashlight, and determine the brightness enhancement degree according to the sum of the ambient light intensity and the light intensity of the flashlight.

Embodiments of the present disclosure provide a photographing apparatus, including the above apparatus for displaying captured a preview image; a receiving module configured to receive a photographing trigger instruction; and a control module configured to turn on the flashlight for photographing to obtain a captured image.

Embodiments of the present disclosure provide an apparatus including a processor, and a memory configured to store instructions executable by the processor. The processor is configured to perform the method described above.

Embodiments of the present disclosure provide a non-transitory computer-readable storage medium storing instructions, when the instructions are executed by a processor of a mobile terminal, the mobile terminal is caused to perform the method described above.

Figure 7:
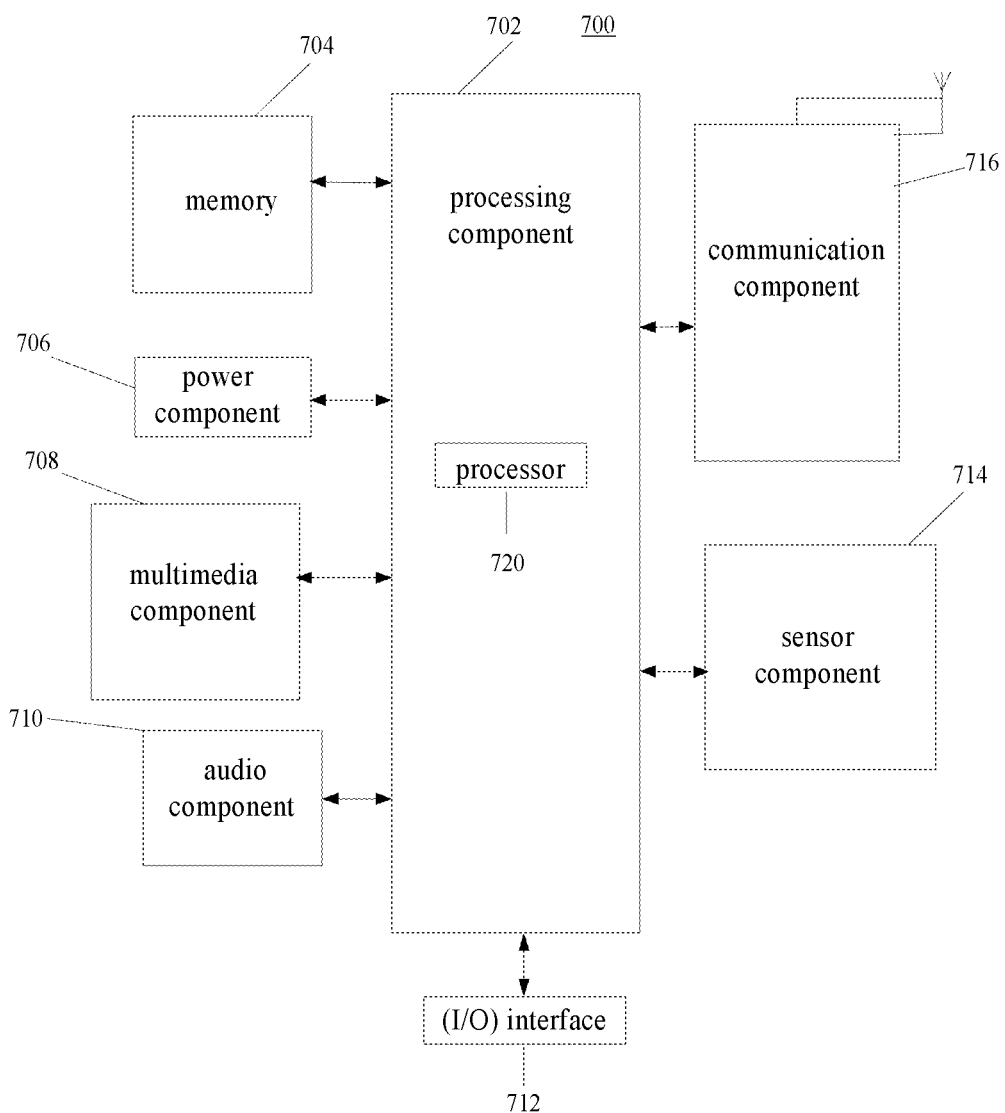
FIG. 7 is a block diagram of an apparatus for displaying a preview image according to an exemplary embodiment.

FIG. 7 is a schematic diagram of an apparatus 700 for displaying a preview image according to an exemplary embodiment. For example, the apparatus 700 may be a mobile phone, a computer, a digital broadcasting terminal, a message transceiver device, a game console, a tablet device, a medical device, a fitness device and a personal digital assistant.

As illustrated in FIG. 7, the apparatus 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls overall operations of the apparatus 700, such as the operations associated with display, telephone calls, data communications, camera operations, and recording operations. The processing component 702 may include one or more processors 720 to execute instructions to perform all or part of the steps in the above described methods. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the apparatus 700. Examples of such data include instructions for any applications or methods operated on the apparatus 700, contact data, phonebook data, messages, pictures, video, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the apparatus 700. The power component 706 may include a power management system, one or more power sources, and any other components associated with the generation, management, and distribution of power in the apparatus 700.

The multimedia component 708 includes a screen providing an output interface between the apparatus 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 708 includes a front-facing camera and/or a rear-facing camera. When the apparatus 700 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 710 is configured to output and/or input audio signals. For example, the audio component 710 includes a microphone ("MIC") configured to receive an external audio signal when the apparatus 700 is in an operation mode, such as a call mode, a recording mode, and a voice recognition mode. The received audio signal may be further stored in the memory 704 or transmitted via the communication component 716. In some embodiments, the audio component 710 further includes a speaker to output audio signals.

The I/O interface 712 provides an interface between the processing component 702 and peripheral interface modules, such as a keyboard, a click wheel, buttons, and the like. The buttons may include, but are not limited to, a home button, a volume button, a starting button, and a locking button.

The sensor component 714 includes one or more sensors to provide status assessments of various aspects of the apparatus 700. For instance, the sensor component 714 may detect an open/closed status of the apparatus 700, relative positioning of components, e.g., the display and the keypad, of the apparatus 700, a change in position of the apparatus 700 or a component of the apparatus 700, a presence or absence of user contact with the apparatus 700, an orientation or an acceleration/deceleration of the apparatus 700, and a change in temperature of the apparatus 700. The sensor component 714 may include a proximity sensor configured to detect the presence of nearby objects without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate communication, wired or wirelessly, between the apparatus 700 and other devices. The apparatus 700 can access a wireless network based on a communication standard, such as WiFi, 4G, or 5G, or a combination thereof. In one exemplary embodiment, the communication component 716 receives a broadcast signal or broadcast associated information from an external broadcast management system via a broadcast channel. In one exemplary embodiment, the communication component 716 further includes a near field communication (NFC) module to facilitate short-range communications. In one exemplary embodiment, the communication component 716 may be implemented based on a radio frequency identity (RFID) technology, an infrared data association (IrDA) technology, an ultra-wideband (UWB) technology, a Bluetooth (BT) technology, and other technologies.

In exemplary embodiments, the apparatus 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 704, executable by the processor 720 in the apparatus 700, for performing the above-described methods. For example, the non-transitory computer-readable storage medium may be a ROM, a RAM, a CD-ROM, a magnetic tape, a floppy disc, an optical data storage device, and the like.

Other embodiments of the present disclosure will be apparent to those skilled in the art from consideration of the specification and practice of the described embodiments. This disclosure is intended to cover any variations, uses, or adaptive changes that follow the general principles of this disclosure and include common general knowledge or customary technical means in the technical field not disclosed in this disclosure. The embodiments are exemplary only, and the true scope and spirit of this disclosure are indicated by the claims.

It should be understood that the present disclosure is not limited to the precise structure that has been described above and shown in the drawings, and various modifications and changes can be made without departing from the scope thereof. The scope of the present disclosure is limited only by the appended claims.

What is claimed is:

1. A method for displaying a preview image, applied to a mobile terminal, comprising:
    obtaining a real-time image collected by an imaging device of the mobile terminal without turning on a flashlight;
    determining at least one target area in the real-time image, wherein each of the at least one target area contains an independent object or a background area;
    determining a distance between the mobile terminal and an entity corresponding to each of the at least one target area;
    determining a brightness enhancement degree for each of the at least one target area respectively according to the distance between the mobile terminal and the entity corresponding to each of the at least one target area and a flashlight parameter of the mobile terminal; and
    performing brightness enhancement on each of the at least one target area respectively according to the brightness enhancement degree for each of the at least one target area, and displaying the brightness-enhanced real-time image as a preview image,
    wherein determining the brightness enhancement degree for each of the at least one target area respectively according to the distance corresponding to each of the at least one target area and the flashlight parameter of the mobile terminal comprises:
        obtaining an ambient light intensity based on an automatic exposure function of the imaging device, and determining a light intensity of the flashlight based on a luminous flux parameter of the flashlight and the distance;
        determining a ratio of a sum of the ambient light intensity and the light intensity of the flashlight to the ambient light intensity; and
        determining the brightness enhancement degree according to the ratio or the sum.

2. The method according to claim 1, wherein determining the at least one target area in the real-time image comprises:
    determining at least one independent object in the real-time image; and
    determining an area corresponding to each of the at least one independent object as one target area.

3. The method according to claim 1, wherein determining the at least one target area in the real-time image comprises:
    determining at least one independent object and a background area in the real-time image;
    determining an area corresponding to each of the at least one independent object as one target area; and
    determining an area corresponding to the background area as one target area.

4. The method according to claim 1, wherein determining the at least one target area in the real-time image comprises:
    determining at least one independent object in the real-time image, and when a number of independent objects located in a central area of the real-time image is greater than one, determining one independent object from the independent objects as a subject, and determining an area corresponding to the subject as the target area; and
    determining one independent object from the independent objects as the subject comprises one of:
        determining an independent object located in a central position among the independent objects as the subject; or
        determining an independent object with a maximum number of pixels covered in the real-time image from the independent objects as the subject.

5. The method according to claim 1, wherein determining the distance between the mobile terminal and the entity corresponding to each of the at least one target area comprises:
    measuring the distance between the mobile terminal and the entity corresponding to each of the at least one target area by using a distance measuring device built in the mobile terminal or a distance measuring device cooperating with the mobile terminal.

6. The method according to claim 1, wherein determining the brightness enhancement degree according to the ratio comprises:
    determining the ratio as the brightness enhancement degree.

7. The method according to claim 1, wherein determining the brightness enhancement degree according to the ratio comprises:
    determining the brightness enhancement degree corresponding to the ratio according to a preset positive correlation function between the ratio and the brightness enhancement degree.

8. A mobile terminal, comprising:
    a processor; and
    a memory configured to store instructions executable by the processor;
    wherein the processor is configured to:
    obtain a real-time image collected by an imaging device of the mobile terminal without turning on a flashlight;
    determine at least one target area in the real-time image, wherein each of the at least one target area contains an independent object or a background area;
    determine a distance between the mobile terminal and an entity corresponding to each of the at least one target area;
    determine a brightness enhancement degree for each of the at least one target area respectively according to the distance between the mobile terminal and the entity corresponding to each of the at least one target area and a flashlight parameter of the mobile terminal; and perform brightness enhancement on each of the at least one target area respectively according to the brightness enhancement degree for each of the at least one target area, and display the brightness-enhanced real-time image as a preview image, wherein, in determining the brightness enhancement degree for each of the at least one target area respectively according to the distance corresponding to each of the at least one target area and the flashlight parameter of the mobile terminal, the processor is configured to:

obtain an ambient light intensity based on an automatic exposure function of the imaging device, and determine a light intensity of the flashlight based on a luminous flux parameter of the flashlight and the distance;

determine a ratio of a sum of the ambient light intensity and the light intensity of the flashlight to the ambient light intensity; and determine the brightness enhancement degree according to the ratio or the sum.

9. The mobile terminal according to claim 8, wherein in determining the at least one target area in the real-time image, the processor is further configured to:

determine at least one independent object in the real-time image; and determine an area corresponding to each of the at least one independent object as one target area.

10. The mobile terminal according to claim 8, wherein in determining the at least one target area in the real-time image, the processor is further configured to:

determine at least one independent object and a background area in the real-time image;

determine an area corresponding to each of the at least one independent object as one target area; and determine an area corresponding to the background area as one target area.

11. The mobile terminal according to claim 8, wherein in determining the at least one target area in the real-time image, the processor is further configured to:

determine at least one independent object in the real-time image, and when a number of independent objects located in a central area of the real-time image is greater than one, determine one independent object from the independent objects as a subject, and determine an area corresponding to the subject as the target area; and determining one independent object from the independent objects as the subject comprises one of:

determining an independent object located in a central position among the independent objects as the subject; or determining an independent object with a maximum number of pixels covered in the real-time image from the independent objects as the subject.

12. The mobile terminal according to claim 8, wherein in determining the distance between the mobile terminal and the entity corresponding to each of the at least one target area, the processor is further configured to:

measure the distance between the mobile terminal and the entity corresponding to each of the at least one target area by using a distance measuring device built in the mobile terminal or a distance measuring device cooperating with the mobile terminal.

13. The mobile terminal according to claim 8, wherein in determining the brightness enhancement degree according to the ratio, the processor is further configured to:

determine the ratio as the brightness enhancement degree.

14. The mobile terminal according to claim 8, wherein in determining the brightness enhancement degree according to the ratio, the processor is further configured to:

determine the brightness enhancement degree corresponding to the ratio according to a preset positive correlation function between the ratio and the brightness enhancement degree.

15. The mobile terminal according to claim 8, wherein the processor is further configured to:

receive a photographing trigger instruction; and turn on the flashlight for photographing to obtain a captured image.

16. A non-transitory computer-readable storage medium having stored therein instructions that, when executed by a processor of a mobile terminal, cause the mobile terminal to perform a method for displaying a preview image, the method comprising:

obtaining a real-time image collected by an imaging device of the mobile terminal without turning on a flashlight;

determining at least one target area in the real-time image, wherein each of the at least one target area contains an independent object or a background area;

determining a distance between the mobile terminal and an entity corresponding to each of the at least one target area;

determining a brightness enhancement degree for each of the at least one target area respectively according to the distance between the mobile terminal and the entity corresponding to each of the at least one target area and a flashlight parameter of the mobile terminal; and performing brightness enhancement on each of the at least one target area respectively according to the brightness enhancement degree for each of the at least one target area, and displaying the brightness-enhanced real-time image as a preview image, wherein determining the brightness enhancement degree for each of the at least one target area respectively according to the distance corresponding to each of the at least one target area and the flashlight parameter of the mobile terminal comprises:

obtaining an ambient light intensity based on an automatic exposure function of the imaging device, and determining a light intensity of the flashlight based on a luminous flux parameter of the flashlight and the distance;

determining a ratio of a sum of the ambient light intensity and the light intensity of the flashlight to the ambient light intensity; and determining the brightness enhancement degree according to the ratio or the sum.

* * * * *